United States Patent
Kumar et al.

(10) Patent No.: US 6,657,987 B1
(45) Date of Patent: Dec. 2, 2003

(54) SCHEDULING METHODOLOGY FOR CONNECTIONS WITH QUALITY OF SERVICE (QOS) CONSTRAINTS IN A POLLING BASED MEDIA ACCESS CONTROL (MAC)

(75) Inventors: Apurva Kumar, New Delhi (IN); Lakshmi Ramachandran, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,920

(22) Filed: Mar. 24, 2000

(51) Int. Cl.[7] .................................................. H04J 3/16
(52) U.S. Cl. ...................... 370/346; 370/230; 370/412; 370/449
(58) Field of Search ........................ 370/229, 230–236, 370/252, 253, 395.2–395.43, 412, 445–451, 238, 414, 346

(56) References Cited

U.S. PATENT DOCUMENTS

| | | | | |
|---|---|---|---|---|
| 5,696,764 A | * | 12/1997 | Soumiya et al. | 370/395.41 |
| 6,038,601 A | * | 3/2000 | Lambert et al. | 709/226 |
| 6,198,728 B1 | * | 3/2001 | Hulyalkar et al. | 370/310.1 |
| 6,442,138 B1 | * | 8/2002 | Yin et al. | 370/232 |
| 6,449,663 B1 | * | 9/2002 | Carney et al. | 710/15 |
| 6,480,505 B1 | * | 11/2002 | Johansson et al. | 370/449 |

* cited by examiner

Primary Examiner—Ricky Ngo
Assistant Examiner—Christopher M Swickhamer
(74) Attorney, Agent, or Firm—Whitham, Curtis & Christofferson, P.C.; T. Rao Coca

(57) ABSTRACT

Media Access Control (MAC) Scheduling for Quality of Service (QoS) uses the bandwidth and delay requirements of a connection to calculate the polling interval, which is the maximum time that the scheduler can be away from the connection. The methodology involves deadline-based scheduling and adapts deadlines based on the number of packets actually arriving to take advantage of any excess bandwidth that is available.

11 Claims, 4 Drawing Sheets

SCHEDULING METHODOLOGY FOR CONNECTIONS WITH QUALITY OF SERVICE (QOS) CONSTRAINTS IN A POLLING BASED MEDIA ACCESS CONTROL (MAC)

BACKGROUND OF THE INVENTION

1. Field of the Invention

The present invention generally relates to Time Division Duplex (TDD) indoor wireless communication networks and, more particularly, to a scheduling algorithm for providing Quality of Service (QoS) by controlling medium access in communication networks. In particular, it can be applied to Master-driven TDD wireless systems for maximizing the schedulable utilization (i.e., maximizing utilization under QoS constraints) of the system and for meeting QoS requirements like token rate and latency (maximum delay).

2. Background Description

Bluetooth™ is a computing and telecommunications industry specifications that describes how mobile phones, computers, personal digital assistants (PDAs), and other devices can interconnect using a short range wireless connection. Each device is equipped with a microchip transceiver that transmits and receives in the frequency band of 2.45 GHz. Each device will have a unique 48-bit address from the Institute of Electrical and Electronics Engineers (IEEE) 802 standard. Connections are one-to-one, and the maximum range is ten meters. Data can be exchanged at a rate of one megabits per second (Mbs) and up to two Mbs in the second generation of the technology. The five founding companies of the Bluetooth™ Special Interest Group (SIG) are Ericsson, International Business Machines (IBM), Intel, Nokia; and Toshiba. Additional information may be had by reference to the Web site www.bluetooth.com and an article by Andrew Seybold entitled "Bluetooth Technology: The Convergence of Communications and Computing", reprinted from *Andrew Seybold's Outlook*, May 1998, on the World Wide Web at www.gsmdata.com/artblue.htm.

Indoor wireless networks based on standards such as Bluetooth™ use frequency hopping to combat the problem of interference from sources such as microwave ovens and cordless telephones, which also use frequencies in the same band. In practical environments, in addition to active interfering sources, there can also be objects such as water fountains and racks of bottles with water content which absorb much of the radiation in the 2.45 GHz band and obstruct communication between master and slave units in the vicinity. Therefore, a master unit needs to detect such problems in communication and take necessary actions to prevent loss of packets during the periods of interference.

In the current Bluetooth™ standard, due to frequency hopping, the carrier frequency used in consecutive time slots is a different one of several different frequencies within the 2.45 GHz band of frequencies. Therefore, an interference in sub-bands centered around one of these frequencies will only affect communication during that time-slot in which the frequency sub-band is used. Further, in the Bluetooth™ standard, a packet can occupy one, three or five time slots, and in the case of multiple size packets, the same frequency as fixed for the first time slot is used. Because of this, it is possible to mask the effect of an interference by transmitting a packet of appropriate size. For example, if it is known that there is high chance of interference in one of the second through fifth time slots, and very low probability of the first time slot being bad, it is possible to skip the frequencies corresponding to second through fifth time slots by transmitting a five time-slot packet instead of one or three time-slot packets.

The characterization of link between any Slave unit and the Master can be done by the Master unit based on the receipt or otherwise of acknowledgments received from the Slave unit. Alternatively, all the Slaves can record the number of times they detect good packet headers sent by the Master to any Slave. This information can be transmitted from the Slaves to the Master at periodic intervals of time. The Master can use this information along with frequency look-ahead to determine the next Slave for communication and also the appropriate packet size.

Master-driven TDD can be described briefly as follows in the context of a pico-cellular system, such as the Bluetooth™ standard. Each cell or pico-net comprises of a Master device and several Slave devices. Each device can either send or receive in a slot. The Master controls the traffic on the pico-net and schedules the Slaves on the wireless channel. The Master schedules a Slave by sending a packet addressed to it, and the Slave replies with its own transmission in the next slot. Thus, Master and Slave transmissions are coupled and controlled by the Master.

Providing Quality of Service (QoS) to the connections makes the scheduling policy very important. QoS is defined by various parameters for different systems. These parameters are negotiated between the Master and the Slave at the time of connection establishment. The link layer QoS parameters for data sessions that we consider are described below:

Token Rate: This is the rate at which data should be drained from the buffer corresponding to a data connection.

Token Bucket size: This is the maximum buffer size that the connection might require. It is assumed that when the buffer is full, any new incoming data is discarded.

Peak Bandwidth: This is the maximum rate at which a burst of data enters the buffer.

Latency: This is the maximum delay that can be tolerated by a single packet.

Maximum burst size: This is the maximum size of a single burst.

Average arrival rate: This is the maximum rate at which data can arrive after a burst has arrived, while the buffer is not empty.

All the above parameters are mapped to a Polling Interval (PI), which is the only parameter that is known to the scheduler, implemented at the Master. The polling interval is defined as the maximum time between two consecutive polls to the same connection. The right choice of this parameter would ensure that data is emptied from the buffer at the required token rate, and the scheduling method which uses this polling interval would ensure that the latency requirement of each connection is met. The polling interval is also dependent on the maximum packet size for a session, and has to be re-calculated every time the maximum packet size changes.

It is assumed that there are two types of sessions—guaranteed and best-effort. For guaranteed sessions, a violation of the QoS parameters results in an exception and the parameters are renegotiated. For best-effort sessions, a temporary violation of the QoS parameters is not that serious. However, even for best-effort sessions, whenever there is a buffer overflow, a violation is raised and the parameters are renegotiated.

Existing Scheduling Policies

There has been a considerable amount of research on scheduling algorithms for communication networks. However, none of these consider the problem of scheduling connections with QoS constraints on a polling based Media Access Control (MAC) layer which does not allow reservations. Some of them are listed below:

S. Lu, V. Bliargavan and R. Srikant, in "Fair Scheduling in Wireless Packet Networks", ACM SIGCOMM'97, August 1997, describe a model for wireless fair scheduling based on an adaptation of fluid fair queueing to handle location-dependent error blasts. They describe an algorithm which provides a packetized implementation of the fluid model while assuming full knowledge of the current channel conditions.

D. Ferrari and D. Verma, in "A Scheme for Real-Time Channel Establishment in Wide-Area Networks", *IEEE Journal on Selected Areas in Communications*, pp. 368–379, April 1990, explore the feasibility of providing real-time services on a packet-switched store-and-forward wide-area network with general topology. The describe a scheme for the establishment of channels with deterministic or statistical delay bounds.

R. L. Cruz, in "Quality of Service Guarantees in Virtual Circuit Switched Networks", *IEEE Journal on Selected Areas in Communications*, vol. 13, no. 6, August 1995, reviews some recent results regarding the problem of providing deterministic quality of service guarantees in slot-based virtual circuit switched networks.

Manish Kalia, Deepak Bansal and Rajeev Shorey, in "MAC Scheduling and SAR policies for Bluetooth: A Master Driven TDD Pico-cellular Wireless System", *Mobile, Multimedia Conference* 1999, pp. 384–388, describe data scheduling and Segmentation and Reassembly (SAR) polling in Master driven TDD pico-cellular wireless system conforming to the Bluetooth™ standard.

K. Jeffay, D. F. Stanat and C. U. Martel, in "On Non-Preemptive scheduling of Periodic and Sporadic Tasks", *Proceedings Real Time System Symposium*, 1991, exam the problem of scheduling a set of periodic or sporadic tasks on a uniprocessor without preemption and without inserted idle time. They show that any set of periodic or sporadic tasks that satisfy certain conditions can be scheduled with an earliest deadline first (EDF) scheduling algorithm.

U.S. patent application Ser. No. 09/434,583 filed Nov. 4, 1999, by Rajeev Shorey, Deepak Bansal and Manish Kalia, for "Media Access Control Scheduling Methodology in Master Driven Time Division Duplex Wireless Pico-Cellular Systems", describes a scheduling strategy that does not take the QoS requirements of different connections into considerations.

U.S. Pat. No. 5,506,848 to Drakopoulos et al. for "Demand Assignment System and Method for Mobile Users in a Community of Interest", describes a slot reservation system in which is not possible for data in packet switched networks.

U.S. Pat. No. 5,274,841 to Natarajan et al. for "Methods for Polling Mobile Users in a Multiple Cell Wireless Network", describes methods for polling mobile users. Here uplink access is done using Carrier Sense Multiple Access which is different from a polling interval based polling model.

U.S. Pat. No. 5,297,144 to Gilbert et al. for "Reservation-based Polling Protocol for a Wireless Data Communication Network", describes a reservation based polling system which is again different from a polling interval based polling.

SUMMARY OF THE INVENTION

According to the present invention, there is provided a scheduling algorithm which maximizes the schedulable utilization and also meets the QoS requirements of each connection. The method is simple to implement and ensures fairness to all connections. The method also includes scheduling of periodic voice slots along with data connections and also incorporates rules for handling wireless errors. The algorithm can be labeled as "Adaptive Per-connection Deadline Scheduling Algorithm", which makes use of the polling interval, which was described in the previous section.

Several scheduling algorithms have been proposed in the literature which maximize the schedulable region among a set of connections. These fall under the Earliest-Deadline-First,(EDF) class of algorithms. However, these policies set per-packet deadlines. The deadline of a packet for a connection is its arrival time plus the maximum tolerable delay of that connection. The packets are then served earliest deadline first. However, these are difficult to implement as packet arrival times need to be taken into account.

Our method uses per-queue deadlines instead of per-packet deadlines. Each connection has a queue where packets to be transmitted are enqueued. The deadline for a queue is set at the time the scheduler departs from the queue. The deadline is the sum of the departure time and the polling interval for that connection. The polling interval is derived based on the QoS requirements in terms of the parameters mentioned in the previous section. The queue with the earliest deadline is served first. The service discipline we use is k-limited. This means that the number of packets served in each visit is k. The value of k could be different for different queues.

We model each guaranteed connection as a periodic task with deadlines. The period of a task depends upon the polling interval of the corresponding session.

For best-effort (non-guaranteed) sessions, the polling interval is increased or decreased based on whether the number of packets actually in the queue is greater or lesser than the quantum k. If the number of packets actually served is less, which means the session is using less bandwidth than it asked for, then the next deadline is extended to allow other connections to make use of the excess bandwidth. Similarly, if the number of packets in the queue is more than k, then the session requires more bandwidth at this instant than it asked for. Hence we advance the next deadline to reduce the chances of a buffer overflow. If the number of packets left in a queue after the scheduler serves k packets is zero, then the polling interval is not changed.

To ensure that no guaranteed session misses its deadline because of a best-effort session requiring extra bandwidth, a best-effort session is scheduled only in the idle times of the processing flow of guaranteed sessions. This ensures that guaranteed services are not affected by best-effort services and the admission control for guaranteed services can be applied without accounting for best-effort services.

The algorithm also has provisions for scheduling voice slots along with data sessions. Besides these, we give rules to be followed for scheduling in the presence of wireless errors.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
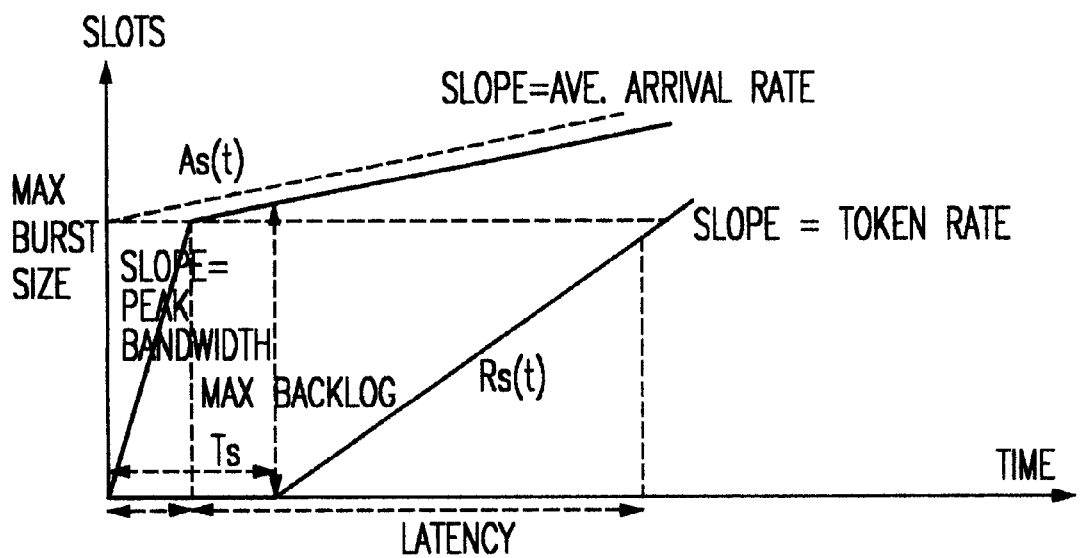
FIG. 1 is a graph illustrating the envelope of the incoming traffic to a connection.

Referring now to the drawings, and more particularly to FIG. 1, there is shown a graph illustrating the envelope of the incoming traffic to a connection. More specifically, FIG. 1 shows the arrival and service curves at the scheduler. $A_s(t)$ denotes the arrival curve, and $R_s(t)$ denotes the service curve. A burst of maximum size arrives at a peak rate, C, after which, until the buffer is emptied, the arrivals are at an average rate. The service starts at most $T_s$ time units after the burst starts arriving. Once service starts, the rate of service is constant at r.

Calculation of the Polling Interval

Assuming that session "s" which requires a token rate $r_s$ is $k_s$-limited, the initial value of the polling interval, $T_s$, for a session "s" is computed as follows, with the assumption that over a long time, if session "s" is always serviced at the end of the polling interval, then we still guarantee the token rate $r_s$.

Figure 2:
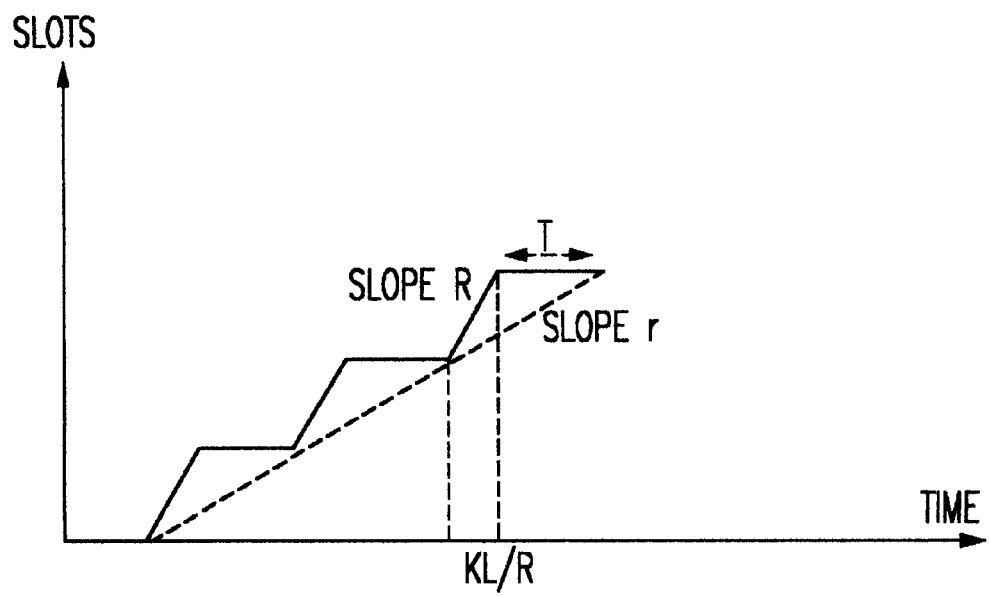
FIG. 2 is a graph illustrating the basis on which equation (1) below is derived.

FIG. 2 shows the relationship between the polling interval, T, and service quantum, kL, the service rate, r, and the maximum bandwidth, R. The time required to service a queue (which has service quantum kL) is kL/R. FIG. 2 shows the worst case where it is always serviced at time T after the previous service ends. The lower bound on the average service rate is the slope r, as shown in FIG. 2. The slope of the curve during service is R, since it is served at the maximum rate during that time interval. That is, $$r_s = \frac{k_s L_s^{\max}}{\left(T_s + \frac{k_s L_s^{\max}}{R}\right)}, \quad (1)$$

where R is the service rate and $L_s^{max}$ is the maximum packet length for session s. It is assumed that a connection transmits only $L^{max}$ size packets as long as it has enough data to fill it. Thus, $$T_s = k_s L_s^{\max}\left(\frac{1}{r_s} - \frac{1}{R}\right).$$

The polling interval as calculated above also needs to ensure that packet delays are not beyond the maximum tolerable limit for that connection (latency). This mapping is done by applying theorems found in the paper by R. L. Cruz, supra. The polling interval chosen for the connection is the minimum of the values calculated to support the token rate and latency.

Scheduling of Guaranteed Connections

Guaranteed connections like other connections negotiate a bandwidth to satisfy their QoS requirements. In contrast to the best effort services, however, they cannot tolerate large fluctuations from the negotiated bandwidth because of stringent latency requirements. As the link layer parameters, including latency, have been mapped to the polling interval, it will be enough to ensure that each session gets its negotiated bandwidth worth of service in every polling interval. One way to ensure constant bandwidth with time is to have synchronous (circuit switched) connections where slots are reserved for each session. But scheduling several such sessions will result in contentions which will result in lower link utilization.

Figure 3:
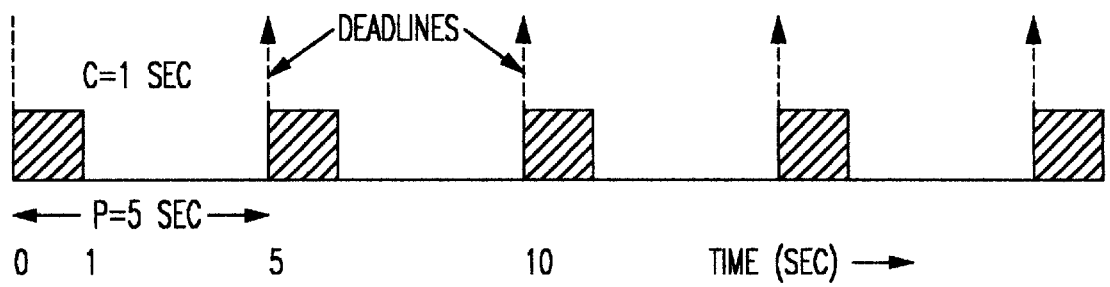
FIG. 3 is a graph showing rate r(c, p) versus service time "c" and period "p" of a periodic task modeling a connection, in which the solid circles on the graph denote the operating points for required token rates of $r_1$ and $r_2$.
Figure 4:
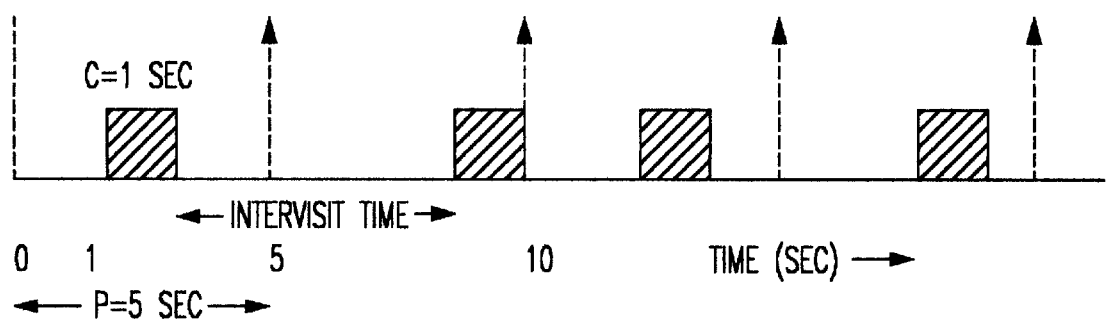
FIG. 4 is a timeline diagram illustrating the service given to a sample queue based on the polling interval.

The proposed alternative is to model each guaranteed connection as a periodic task with deadlines, as generally illustrated in FIG. 3. Specifically, FIG. 3 is a graph showing rate r(c, p) versus service time "c" and period "p" of a periodic task modeling a connection, in which the solid circles on the graph denote the operating points for required token rates of $r_1$ and $r_2$. A "periodic task with deadline", $\tau=(c, p)$ is defined as a sequence of requests for "c" units of service time. Each request is "p" units of time apart and has to be serviced before arrival of the next request. FIG. 4 shows times at which the periodic task in FIG. 3 gets serviced by a uniprocessor in the presence of other tasks using some arbitrary scheduling scheme which satisfies all its deadlines. If several such connections are schedulable, i.e., all deadlines are met, using some scheduling policy, then the following are ensured:

(i) The maximum time away from a connection is <2p. The maximum intervisit time is 2(p-c).

(ii) Bandwidth c/p worth of service is given to the connection in every p units of time, i.e., c units of service every p units.

Thus, such a model ensures short term bandwidth guarantee for a connection and it conforms to a polling interval based model where 2(p-c) is the polling interval; i.e., the maximum time the server can be away from the connection. The advantage of using such a model over a circuit switched one is that service in this model is asynchronous. A connection can be serviced anytime before its deadline so there is flexibility available with the scheduler. Another advantage of using this model is that the problem of non-preemptively scheduling a task set with arbitrary release times of connections is known to have an "optimal" solution. Non-Preemptive Earliest Deadline First (EDF) is known to be optimal in the sense of providing a feasible schedule whenever one, is possible using any non-preemptive scheduling. See K. Jeffay, D. F. Stanat and C. U. Martel, supra. Moreover, the schedulability conditions are also easily evaluated which can be used for admission control of new connections.

Admission Control for Guaranteed Sessions

The admission control can use the well established necessary and sufficient conditions for a periodic task set with arbitrary release times to be schedulable using non-preemptive EDF. These conditions as given in K. Jeffay, D. F. Stanat and C. U. Martel, supra. Satisfying these conditions will ensure that all connections will meet their QoS guarantees, irrespective of release times.

Application to a Master Driven TDD System

Figure 5:
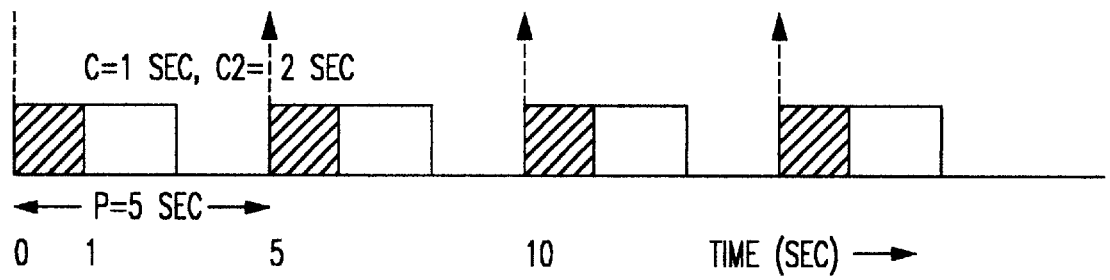
FIG. 5 is a timeline diagram showing a periodic task with period p=5 sec. and c=1 sec., wherein the deadline for a service request is the arrival time of the next request, this task requiring 20% (1/5) bandwidth of the link.

For a master driven polling system in which a Slave to Master (reverse) transmission is coupled with Master to Slave (forward) transmission, the two connections can be combined into a single periodic task with service time $c=c_1+c_2$ where $c_1$ and $c_2$ are the service times (in slots) of individual connections and period $p=p_1=p_2$. FIG. 5 shows the tasks corresponding to forward and reverse transmissions. The reverse link requests are coupled with the forward link because of TDD. In the following section a method for calculating the period of the composite task from the link layer parameters of the forward and reverse link is given.

Calculating Period and Service Time of Composite Task

| | Definitions subscript 1 and 2 for forward and reverse links resp. | Unit |
| --- | --- | --- |
| $c_1,c_2,c$ | Service times for forward, reverse and composite tasks | slots |
| $r_1,r_2$ | Required token rates for the connections | bps |
| p | Period of composite task | slots |
| $P_{latency, i}$ | Maximum polling interval calculated on the basis of latency for i = 1, 2 | slots |
| $B_{max, i}$ | Token bucket sizes for connection I | bits |
| $Latency_i$ | Maximum tolerable delay for connection i | sec. |
| SlotTime | Duration of a single slot | sec. |
| DataSize(c) | Data bits (payload) in a c slot packet | bits |

Function DataSize(c) reflects the payload in a packet for different packet sizes. It is assumed that, increasing packet size causes as increase in the percentage of data (payload) in the packet, (i.e., the header does not increase by the same proportion). In the following we assume a fixed number of packet sizes.

To ensure that maximum tolerable delay is not crossed by either connection.

$$Latency_i > P_{latency,i} \times SlotTime + \frac{B_{max,i}}{r_i}$$

Largest integer values of $P_{latency, i}$ satisfying the above are found. As the polling interval for both connections has to be same, $$P_{latency}=\min(P_{latency\ 1}, P_{latency\ 2})$$

This is the polling interval for the composite connection to satisfy latency requirements. Now, from FIG. 5, Polling interval (PI) and period are related by PI=2(P—C). Thus, $$P_{latency} > 2[p-(c_1+c_2)] \quad (2)$$

Figure 6:
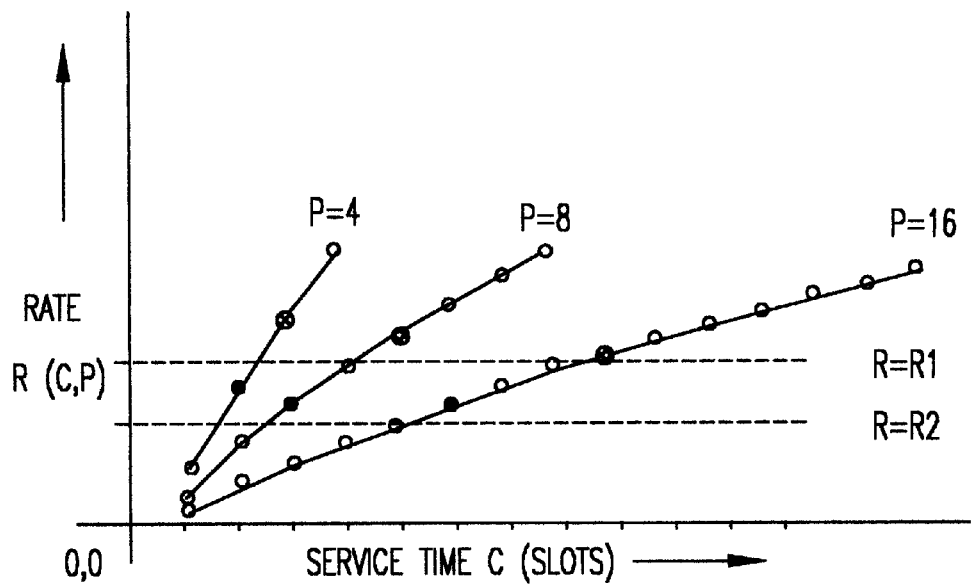
FIG. 6 is a timeline diagram showing possible times at which the periodic requests get service in presence of other such tasks, wherein the intervisit time (time that the server is away from this task) in less than or equal to 2p-c)

Now, the period required in order to satisfy token rates $r_1$ and $r_2$ $$p_i = \left\lfloor \frac{DataSize(c_i)}{r_i \times SlotTime} \right\rfloor, \quad (3)$$

where $\lfloor x \rfloor$ represents the greatest integer less than or equal to x. FIG. 6 shows the curve of r(c,p), the data-rate achieved for a connection with service time c and period p. It is a plot of, $$r(c, p) = \frac{DataSize(c_i)}{p \times SlotTime} \quad (4)$$

From FIG. 6, we can see that if we are given the pair $(r_1, r_2)$, we can find several pairs $(c_1, c_2)$ which correspond to points lying above $r=r_1$ and $r=r_2$ for a value of polling interval $p_j$. Then $(p_j, c_{1j}, c_{2j})$ is a possible option if token rate was the only QoS requirement. To check whether latency is satisfied, we check if $(p_j, c_{1j}, c_{2j})$ satisfies equation (2). If it does, then we have feasible values for p, $c_1$ and $c_2$.

When there are several such feasible values then one option is to choose higher values of p, $c_1$ and $c_2$. This means using larger packet sizes. From equation (3), p and DataSize (c) are roughly proportional for a given r.

Thus, because of the nature of DataSize(c), on increasing c, p increases at a faster rate than c. At the link, utilization is given by c/p, hence increasing c is beneficial for achieving the same QoS with lower link utilization. However, equation (2) becomes harder to satisfy with increasing packet sizes and polling intervals. If we have more than one feasible values for p, $c_1$ and $c_2$ which satisfy both the token rate and latency constraints, then we can choose the one with minimum $(c_1+c_2)/p$. This leads to making choices in favor of large packets and large polling intervals among the feasible set.

However, there are some drawbacks in choosing large packet sizes. Non-preemptive scheduling of a task set with a given total utilization becomes harder for larger service times of tasks. Secondly, for wireless links, the packet error probability becomes significant for larger size packets.

Scheduling of Best-Effort Connections
Adapting Deadlines at the End of Every Visit At the end of the $i^{th}$ visit to a queue for session s, the number of packets left in the queue, $N_s^i$, and the number of packets actually served, $k_s^i$, are used to compute the new value of $T_s$ in the following manner.
For $k_s^i < k_s$, $$T_s^i = \min\left(\left(T_s + \frac{(k_s - k_s^i)L_s^{max}}{R}\right), T_s + B_s\right) \quad (5)$$

For $k_s^i=k$, $N_s^i>0$, $$T_s^i = \max\left(\left(T_s + \frac{N_s^i L_s^{max}}{R}\right), T_s - B_s\right) \quad (6)$$

For $k_s^i=k_s$, $N_s^i=0$, $T_s^i$ remains unchanged at $T_s$

Figure 7:
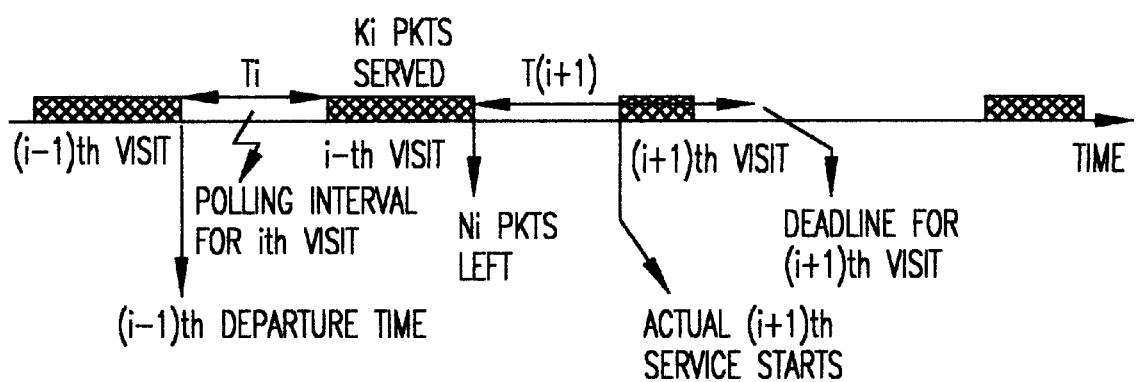
FIG. 7 is a timeline diagram showing how the two connections $\tau_1=(1, 5)$ and $\tau_2=(2, 5)$ are considered as a composite task, $\tau=(3, 5)$.

It should be noted that at any queue, the new deadline at the end of the $i^{th}$ visit is the sum of the current time and the value of $T_s^i$ as calculated above. FIG. 7 shows the deadlines and the polling intervals of a queue, along with the number of packets left in the queue at the time one service quantum is completed. The shaded region represents the queue being served, while the time between the shaded regions refers to the time that the scheduler stays away from the queue. This is bounded by the polling interval, suing which deadlines are set. Note that a deadline at the end of a service quantum is the current time added to the poling interval of that queue.

In the above equations, $B_s$ is the upper bound on the change in polling interval (from $T_s$) for session s. This is done to ensure that no session is punished for not having made use of its allotted bandwidth temporarily. Formally, this means $|T_s^i - T_s| \geq B_s$. Thus, the adaptive deadline algorithm ensures that the new polling interval at the-end of any visit lies between $T_s - B_s$, $T_s + B_s$. This in turn implies a bound on the variation in short term throughput. To make the calculations simpler, only the maximum packet length of a session is used, though summing up the actual lengths of the packets served would make the above equations more accurate. To make the algorithm fair to all the connections, we bound the number of times, N, a session can extend or advance its polling interval. The scheduling is then carried out earliest deadline first.

Application to a Master-driven TDD System

The above algorithm can be applied to a Master-driven TDD system, which was described in the "Background" section.

There are several constraints that have to be satisfied for applying the algorithm to a Master-Slave TDD system, where the scheduler is located at the master node. We assume that there is a queue per session at the Master, and one queue at the Slave. Service for each link consists of a pair of packets, one each from the queue at the Master and at the Slave. Packet sizes are in terms of slots and the maximum packet size for a session is known. Acknowledgments for packets from the Master are always sent by the Slave piggybacked on the packet header. If a Slave has no data to send, then the acknowledgment is still sent in the header of an empty packet, of size 1 (slot). When a Master has no data to send, it still polls the slave, since there might be packets buffered at the Slave. This would happen very frequently for applications that are inherently asymmetric. The queue length at the Master is known for all the links, while information about queue lengths at the Slaves is limited.

The Polling Interval, $T_s$, of a session s corresponds to the initial deadline as calculated in the Adaptive Deadline algorithm. The reserved rate, r, is the token rate: required by a session. Packet lengths are in terms of slots and $L_s^{max}$ is the sum of the maximum lengths of packets at the Master and Slave side for that session, since in this system, each "packet" is composed of a Master and a Slave packet. The time to service a packet is the packet length multiplied by the length of a slot which is equal to 1/R. Thus, the number of packets (pairs) served at the $i^{th}$ visit to a queue (pair) is given by $k_s^i$. The number of packets present in the Slave queue is not known to the Master. If the number of packets at the Master queue is at least $k_s$, then we do not have a problem. But if the number of packets at the Master queue is less than $k_s$, then after the Master queue becomes empty, it still keeps polling the Slave with 1-size packets until the Slave returns an empty packet (an Ack with no data) or the limit $k_s$ is reached, whichever is earlier.

Finally, the number of packets left in a queue (pair), $N_s^i$ (at the end of the $i^{th}$ visit) is approximated as follows. Ideally, this should be the greater of the number of packets left in the Master and the Slave queues. If $k_s^i = k_s$, then to check if $N_s^i > 0$, the scheduler checks if the Master queue is backlogged. If not, the Slave queue:state (backlogged or not) is used, which can be conveyed to the Master using one bit in the packet header, as in Manish Kalia, Deepak Bansal and Rajeev Shorey, supra. If the number of packets at the Master is such that $$\frac{N_s^i L_s^{max}}{R}$$

is at least $B_s$, then the number of packets at the Slave does not matter. However, if $$\frac{N_s^i L_s^{max}}{R}$$

is less than $B_s$, then the number of packets in the Master is taken. Suppose the Master queue is empty and the Slave queue is not, then we make the approximation that 2 or 3 bits can convey the state of the Slave queue (four or eight states respectively).

Figure 8:
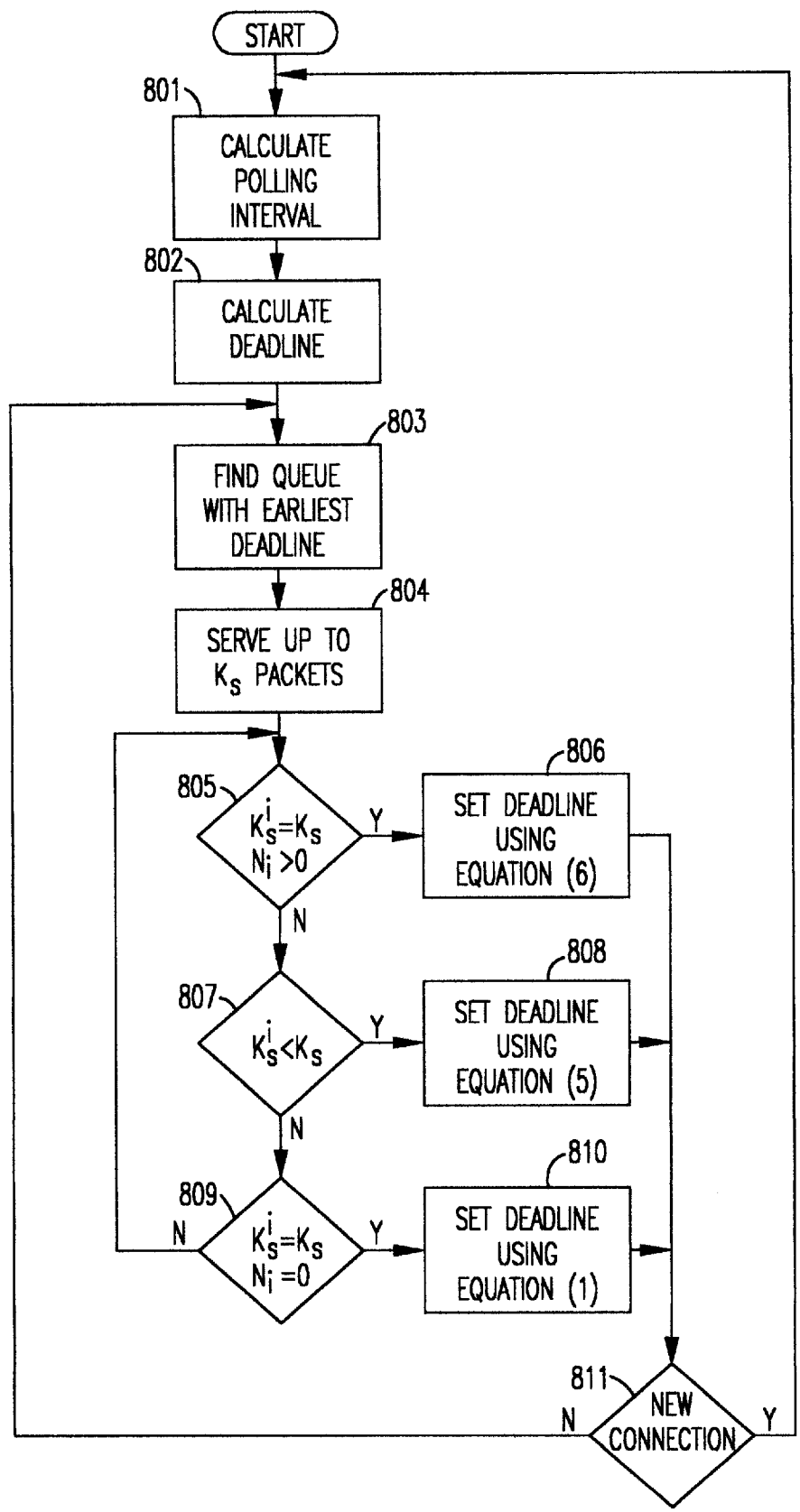
FIG. 8 is a flow diagram showing the logic of an implementation of the algorithm according to the invention.

The algorithm may be implemented as illustrated in the flow diagram of FIG. 8. The process begins in function block 801 by calculating the polling interval, $T_i$, according to equation (1). Next, in function block 802, the deadline is calculated as deadline(i)=current time+$T_i$. The queue with the earliest deadline is found in function block 803. This queue is served up to $k_s$ packets in function block 804. The number of packets served is denoted $k_s^i$, where i is the $i^{th}$ visit to this queue. A test is made in decision block 805 to determine if $k_s^i$ equals $k_s$ and the number of packets left in the queue, $N_i$, is greater than zero. If so, then deadline(s) are set in function block 806 equal to the current time plus the polling interval (found using equation (6)). If not, then a test is made in decision block 807 to determine if $k_s^i$ is less than $k_s$. If so, then deadline(s) are set in function block 808 equal to the current time plus the polling interval (found using equation (5)). If not, then a test is made in decision block 809 to determine if $k_s^i$ equals $k_s$ and the number of packets, $N_i$, left in the queue is equal to zero. If so, then deadline(s) are set in function block 810 equal to the current time plus the polling interval (found using equation (1)); otherwise, the process returns to decision block 805. Once the deadline(s) are set, a test is made in decision block 811 to determine if a new connection has arrived. If so, the process returns to function block 801; otherwise, the process goes back to function block 803.

Scheduling in the Presence of Wireless Errors

Whenever a connection experiences errors on the wireless channel, the number of slots missed (and not yet compensated for) on each connection is noted. This information is used to distribute the extra bandwidth fairly among all the connections. The following rules are to be observed in addition to those already in the algorithm.

1. If an error occurs on a guaranteed link, and there are best effort links active, then only the best effort links are involved in compensating for the lost bandwidth.
2. If in L, there are no best effort links, then the other active guaranteed links are used to compensate for the loss as long as there is no violation of their QoS requirements. This is achieved by calculating the "gain time" for each guaranteed link; i.e., the extra time available for the link before its deadline has to be met. Before scheduling each guaranteed link(periodic task), if the deadline subtracted from the service time required for the lost packet (master slave packet pair) is non-negative, then the extra packets are serviced before scheduling it. Note that since it is the guaranteed links that are compensating in this case, there is no need for sharing the compensation proportional to the allotted rates as in the best effort case.
3. If an error occurs on a best effort link, only best effort links are used to compensate for the loss. The method for adjusting the deadlines of the best effort links is based on the wireless fair scheduling model proposed in S. Lu, V. Bhargavan and R. Srikant, supra. The compensation is done in proportion to the reserved bandwidths of the sessions. Since the polling intervals are a measure of the allotted bandwidth, they are extended in proportion to their reserved rates.

Scheduling in the Presence of Voice Slots

The voice slots are assumed to be periodic, the interspacing being dependent on the number and type of voice channels. The voice packets are assumed to be always one slot in length, and the type of connection is described by a parameter, $T_{sco}$, which is the interval between two consecutive polls from a Master to a Slave. The calculation of deadlines for the data sessions is modified by extending the deadline depending on the number and type of voice connections present. Suppose the deadline of a data session, calculated without taking into account the voice channels is $D_i$, then the new deadline is calculated as $D_i+((D_i N_v)/(T_{sco}/2))$, where $N_v$ is the number of voice channels present (and allowing data sessions). The rate guaranteed to the session is changed to reflect the new polling interval.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of scheduling of connections with quality of service (QoS) constraints in a polling based media access control (MAC) scheduling methodology for Master-driven Time Division Duplex (TDD) systems comprising the steps of:

a) calculating a polling interval, $T_s$, according to $$T_s = k_s L_s^{max}\left(\frac{1}{r_s} - \frac{1}{R}\right),$$

where $r_s$ is a token rate, R is a service rate, $k_s$ is a number of packets served in each session s, and $L_s^{max}$ is a maximum packet length for session s;

b) calculating a deadline as deadline(i)=current time+$T_i$;

c) finding a queue with the earliest deadline;

d) serving the queue with up to $k_s$ packets, a number of packets served being $k_s^i$, where i is the $i^{th}$ visit to the session s;

e) if $k_s^i$ equals $k_s$ and the number of packets, $N_i$, left in the queue is greater than zero, then setting deadline(s) equal to the current time plus a polling interval calculated as $$T_s^i = \max\left(\left(T_s + \frac{N_s^i L_s^{max}}{R}\right), T_s - B_s\right),$$

where $B_s$ is a bucket size for the session s;

f) if $k_s^i$ is less than $k_s$, then setting deadline(s) equal to the current time plus a polling interval calculated as $$T_s^i = \min\left(\left(T_s + \frac{(k_s - k_s^i)L_s^{max}}{R}\right), T_s + B_s\right);$$

g) if $k_s^i$ equals $k_s$ and the number of packets, $N_i$, left in the queue is zero, then setting deadline(s) equal to the current time plus a polling interval calculated as in step a);

h) if a new connection has arrived, repeat beginning at step a);

i) else go back to step c).

2. The method of scheduling recited in claim 1, further comprising the step of using a polling interval, which is a maximum time that a scheduler can stay away from a connection.

3. The method of scheduling recited in claim 1, further comprising the step of using per-queue deadlines which are computed using the polling interval.

4. The method of scheduling recited in claim 1, further comprising the steps of:

recording the number of packets left in the queue when a scheduler leaves the queue; and using the recorded information on the number of packets left in the queue to extend or advance the polling interval for the next visit to the same queue.

5. The method of scheduling recited in claim 1, further comprising the steps of:

recording a number of slots missed in each link due to wireless errors; and using the recorded information on the number of slots missed to compensate the link.

6. The method of scheduling recited in claim 1, further comprising the steps of calculating the polling interval for a link based on rate and delay requirements of the connection while taking into account the maximum size of a packet for the connection.

7. The method of scheduling recited in claim 1, wherein per-connection deadlines are used.

8. The method of scheduling recited in claim 1, wherein a guaranteed connection with required Token rate r and Latency L and Token Bucket B is modeled as a periodic task with period P (in slots) and packet size C slots, satisfying the following:

$L > P' \times \text{SlotTime} + B/r$, and $r < \text{DataSize}(C)/(\text{SlotTime} \times P)$, where $P'+2(P-C)$.

9. The method of scheduling recited in claim 8, further comprising the step of selecting packet sizes and polling intervals for guaranteed bi-directional links with possibly different requirements in forward and reverse directions in a polling based TDD MAC.

10. The method of scheduling recited in claim 9, wherein the step of selecting packet sizes comprises the step of finding periods of forward and reverse periods, $p_1$ and $p_2$, respectively, and service times for forward and reverse tasks, $c_1$ and $c_2$, respectively.

11. The method of scheduling recited in claim 10, wherein the step of finding comprises the steps of:

setting $p_1=p_2=p$;

determining p, $c_1$, $c_2$ according to $P_{latency} > 2[p-(c_1+c_2)]$ and $$p_i = [x] = \left[\frac{DataSize(c_i)}{r_i \times SlotTime}\right],$$

where [x] represents the greatest integer less than or equal to x, wherein any set of integral values for p, $c_1$ and $c_2$ satisfying all the above conditions is a feasible solution and the maximum values of $c_1$ and $c_2$ can be p.

* * * * *